(12) United States Patent
Gill et al.

(10) Patent No.: US 11,086,143 B1
(45) Date of Patent: Aug. 10, 2021

(54) TUNABLE AND FOVEATED LENS SYSTEMS

(71) Applicant: Apple Inc., Cupertino, CA (US)

(72) Inventors: Patrick R. Gill, Cupertino, CA (US); Miikka M. Kangas, Campbell, CA (US); Jeffrey G. Koller, San Jose, CA (US); Alexander A. Miles, Cupertino, CA (US); Yu Horie, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 16/436,784

(22) Filed: Jun. 10, 2019

Related U.S. Application Data

(60) Provisional application No. 62/683,520, filed on Jun. 11, 2018.

(51) Int. Cl.
| | |
|---|---|
| *G02F 1/1343* | (2006.01) |
| *G02C 7/08* | (2006.01) |
| *G02F 1/1335* | (2006.01) |
| *G02F 1/1333* | (2006.01) |
| *G02F 1/1337* | (2006.01) |

(52) U.S. Cl.
CPC ........... *G02C 7/081* (2013.01); *G02F 1/1337* (2013.01); *G02F 1/1343* (2013.01); *G02F 1/133345* (2013.01); *G02F 1/133526* (2013.01)

(58) Field of Classification Search
None
See application file for complete search history.

(56) References Cited

U.S. PATENT DOCUMENTS

| | | | |
|---|---|---|---|
| 9,146,444 B2 * | 9/2015 | Wada | G02F 1/1341 |
| 2010/0026920 A1 * | 2/2010 | Kim | H04N 13/305 |
| | | | 349/15 |
| 2016/0143528 A1 | 5/2016 | Wilf et al. | |

(Continued)

FOREIGN PATENT DOCUMENTS

WO      2017216716 A1      12/2017

OTHER PUBLICATIONS

Liwei Li et al., Near-Diffraction-Limited and Low-Haze Electro-Optical Tunable Liquid Crystal Lens with Floating Electrodes, Optical Society of America, Mar. 29, 2013, vol. 21, No. 7, Liquid Crystal Institute, Kent University, Kent, OH, United States.

(Continued)

*Primary Examiner* — James A Dudek
(74) *Attorney, Agent, or Firm* — Treyz Law Group, P.C.; Kendall W. Abbasi

(57) ABSTRACT

A pair of eyeglasses may include one or more adjustable lenses that are each configured to align with a respective one of a user's eyes. The adjustable lenses may each include electrically modulated optical material such as one or more liquid crystal cells. The liquid crystal cells may include arrays of electrodes that extend along one, two, three, four, or more than four directions. Control circuitry may apply control signals to the array of electrodes in each liquid crystal cell to produce a desired phase profile. Each lens may be foveated such that portions of the lens within the user's gaze exhibit a different phase profile than portions of the lens outside of the user's gaze. The control circuitry may adjust the location of the optically distinct area so that it remains aligned with the user's gaze.

20 Claims, 9 Drawing Sheets

(56) References Cited

U.S. PATENT DOCUMENTS

| | | |
|---|---|---|
| 2017/0068134 A1 | 3/2017 | Yadin et al. |
| 2017/0160440 A1 | 6/2017 | Yadin et al. |
| 2017/0160518 A1 | 6/2017 | Lanman et al. |
| 2017/0269453 A1* | 9/2017 | Galstian ................ G02F 1/1337 |
| 2021/0141212 A1 | 5/2021 | Jacoby et al. |
| 2021/0149197 A1 | 5/2021 | Yadin et al. |

OTHER PUBLICATIONS

Brett E. Bagwell et al. Liquid Crystal Based Active Optics, Proceedings of SPIE—The International Society for Optical Engineering, Aug. 15-16, 2006, Novel Optical Systems Design and Optimization IX—San Diego, CA, United States.

* cited by examiner

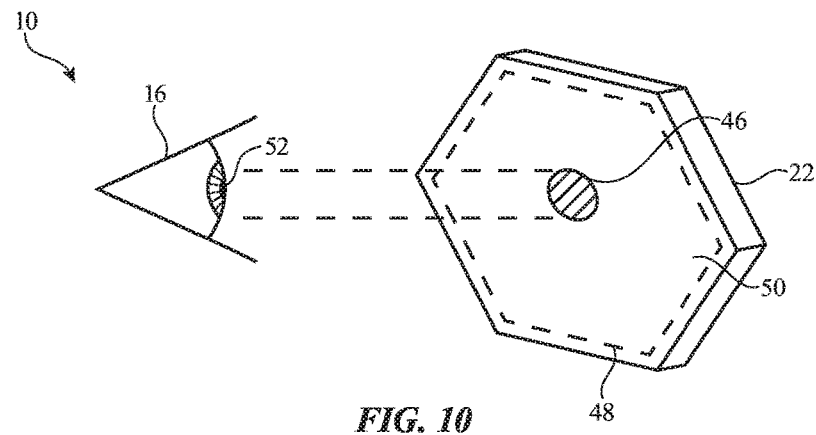
FIG. 10
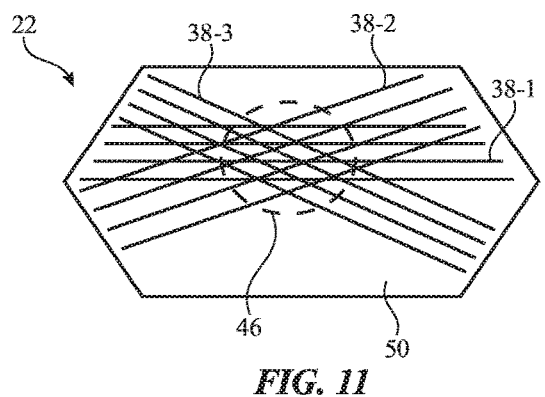
FIG. 11
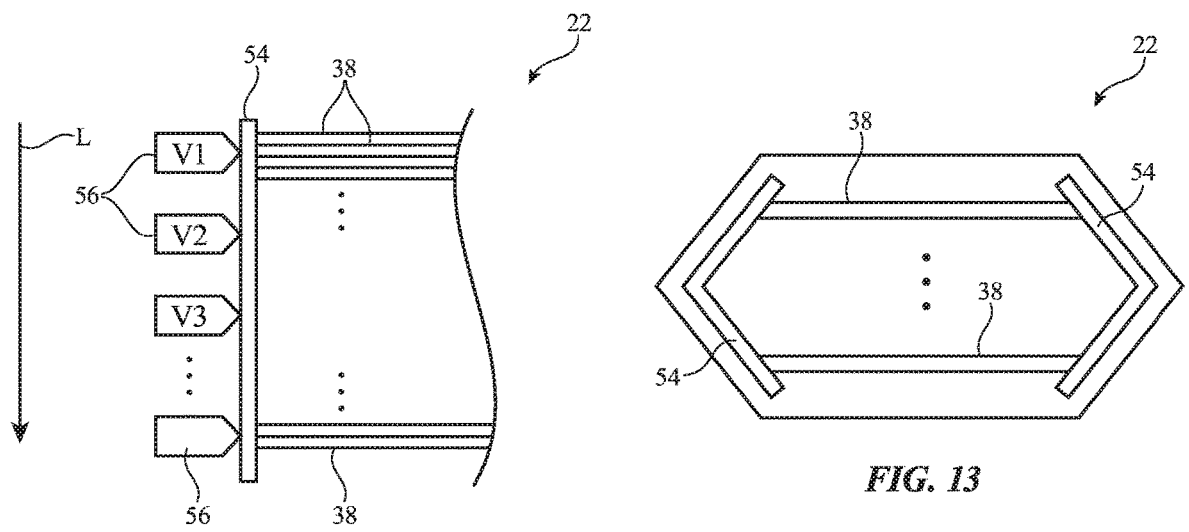
FIG. 12
FIG. 13

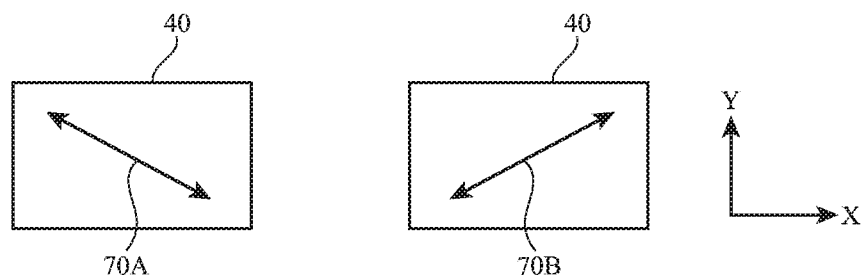
FIG. 20
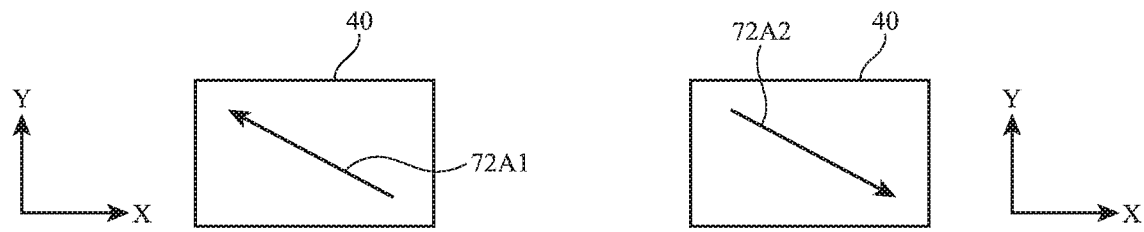
FIG. 21     FIG. 22
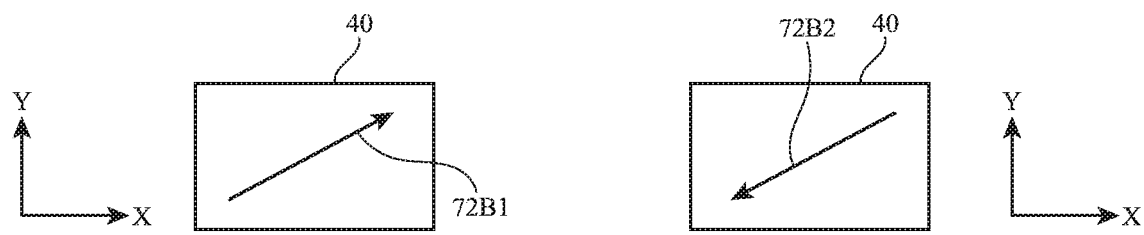
FIG. 23     FIG. 24

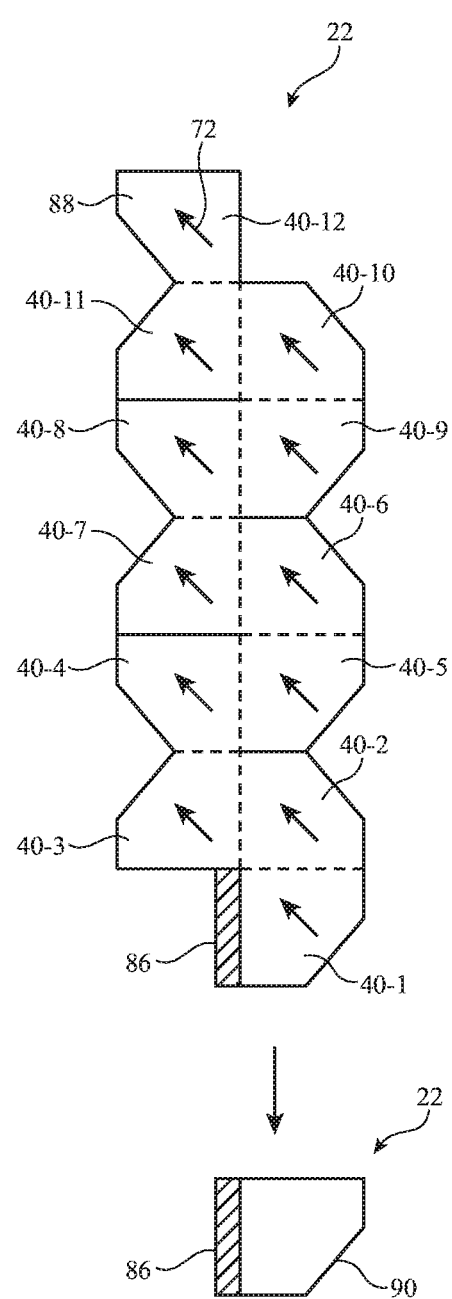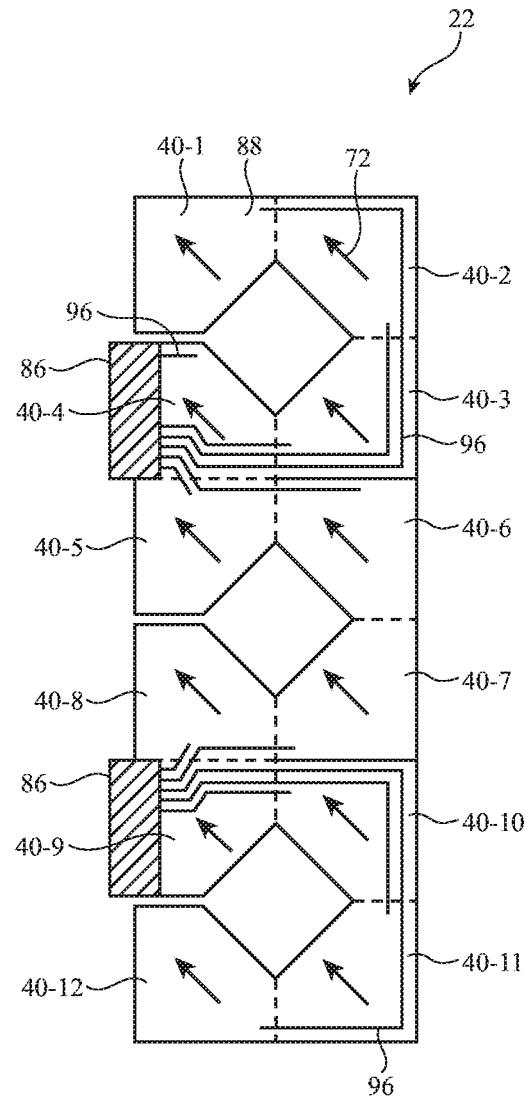
FIG. 25
FIG. 26

TUNABLE AND FOVEATED LENS SYSTEMS

This application claims the benefit of provisional patent application No. 62/683,520, filed Jun. 11, 2018, which is hereby incorporated by reference herein in its entirety.

BACKGROUND

This relates generally to optical systems, and, more particularly, to devices with tunable lenses.

Eyewear may include optical systems such as lenses. For example, eyewear such as a pair of glasses may include lenses that allow users to view the surrounding environment.

It can be challenging to design devices such as these. If care is not taken, the optical systems in these devices may not be able to accommodate different eye prescriptions and may not perform satisfactorily.

SUMMARY

Eyeglasses may be worn by a user and may include one or more adjustable lenses each aligned with a respective one of a user's eyes. For example, a first adjustable lens may align with the user's left eye and a second adjustable lens may align with the user's right eye. Each of the first and second adjustable lenses may include one or more liquid crystal cells or other voltage-modulated optical material. Each liquid crystal cell may include a layer of liquid crystal material interposed between transparent substrates. Control circuitry may apply control signals to an array of electrodes in the liquid crystal cell to adjust a phase profile of the liquid crystal material.

In some arrangements, each adjustable lens may include three or six liquid crystal cells, each having an associated array of electrodes. The electrodes in the liquid crystal cells may be oriented along three different directions. If desired, arrangements with fewer than three or more than three directions may be used.

The adjustable lenses may be foveated such that the liquid crystal within the user's gaze is controlled to exhibit a different optical power than the liquid crystal outside of the user's gaze. The control circuitry may track the user's gaze with a sensor system and may adjust the location of the optically distinct area of the adjustable lenses so that it remains aligned with the user's gaze.

Such optical powers can be helpful to users exhibiting presbyopia, a condition whereby the user's eyes are no longer able to adjust their focal power to bring into focus objects at significantly different distances. Glasses able to compute the deficiency in the user's accommodation can correct for this deficiency through applying distinct optical power. Limiting the spatial extent of the differing optical power can reduce disorienting visual sensations caused by changes in magnification applied to images of the world as seen through the glasses.

Further, a user's eyes may exhibit static or focus-dependent optical defects known as "higher-order aberrations" that are not in general correctable by any static prescription, but can be partially or completely correctable by the portion of variable phase that follows a user's gaze.

In some arrangements, adjustable lenses may include one or more liquid crystal modules each having first and second liquid crystal cells. The first liquid crystal cell may have a liquid crystal layer with a first liquid crystal alignment orientation and the second liquid crystal cell may have a liquid crystal layer with a second liquid crystal alignment orientation that is antiparallel to the liquid crystal alignment orientation.

The adjustable lenses may have transparent electrodes such as high aspect ratio indium tin oxide electrodes that are supplied with control signals by the control circuitry. Control signal lines may be used to distribute the control signals to the electrodes. The electrodes may have a first pitch, and the control signal lines may have a second pitch that is larger than the first pitch. A conductive strip or serpentine path having a resistance that varies along its length may be coupled between the control signal lines and the electrodes. The voltage value received by a given one of the electrodes may be determined at least partly based on a weighted average of the voltages at the two nearest signal lines, the weights being determined by the relative proximities of the signal lines. This permits spatially continuous high spatial resolution signals using a coarser grid of applied control signals.

Liquid crystal materials are herein used by way of an example of an electrically modulated optical material. Other electrically modulated optical materials can be used in place of the liquid crystals described herein.

BRIEF DESCRIPTION OF THE DRAWINGS

FIG. 10 is a perspective view of a foveated adjustable lens system in accordance with an embodiment.

FIG. 11 is a top view of an illustrative adjustable lens system having a subset of electrodes driven such as to create a lens patch with variable optical power that aligns with a user's gaze in accordance with an embodiment.

FIG. 12 is a diagram of an illustrative adjustable lens having an array of electrodes that receive control signals from control signal lines through a resistive strip in accordance with an embodiment.

FIG. 13 is a top view of an illustrative adjustable lens having resistive strips along opposing edges of the lens in accordance with an embodiment.

FIG. 20 is a top view of illustrative liquid crystal cells in an adjustable lens component that modulate different polarization angles in accordance with an embodiment.

FIG. 21 is a top view of an illustrative liquid crystal cell having a first liquid crystal alignment orientation to modulate light of a first polarization angle in accordance with an embodiment.

FIG. 22 is a top view of an illustrative liquid crystal cell having a second liquid crystal alignment orientation to modulate light of the first polarization angle in accordance with an embodiment.

FIG. 23 is a top view of an illustrative liquid crystal cell having a first liquid crystal alignment orientation to modulate light of a second polarization angle in accordance with an embodiment.

FIG. 24 is a top view of an illustrative liquid crystal cell having a second liquid crystal alignment orientation to modulate light of a second polarization angle in accordance with an embodiment.

FIG. 25 is a top view of an illustrative adjustable lens component in which multiple liquid crystal cells share a common pair of substrates that may be cut and folded in accordance with an embodiment.

FIG. 26 is a top view of an illustrative adjustable lens component in which multiple liquid crystal cells share a common pair of substrates that may be cut and folded in accordance with an embodiment.

DETAILED DESCRIPTION

Figure 1:
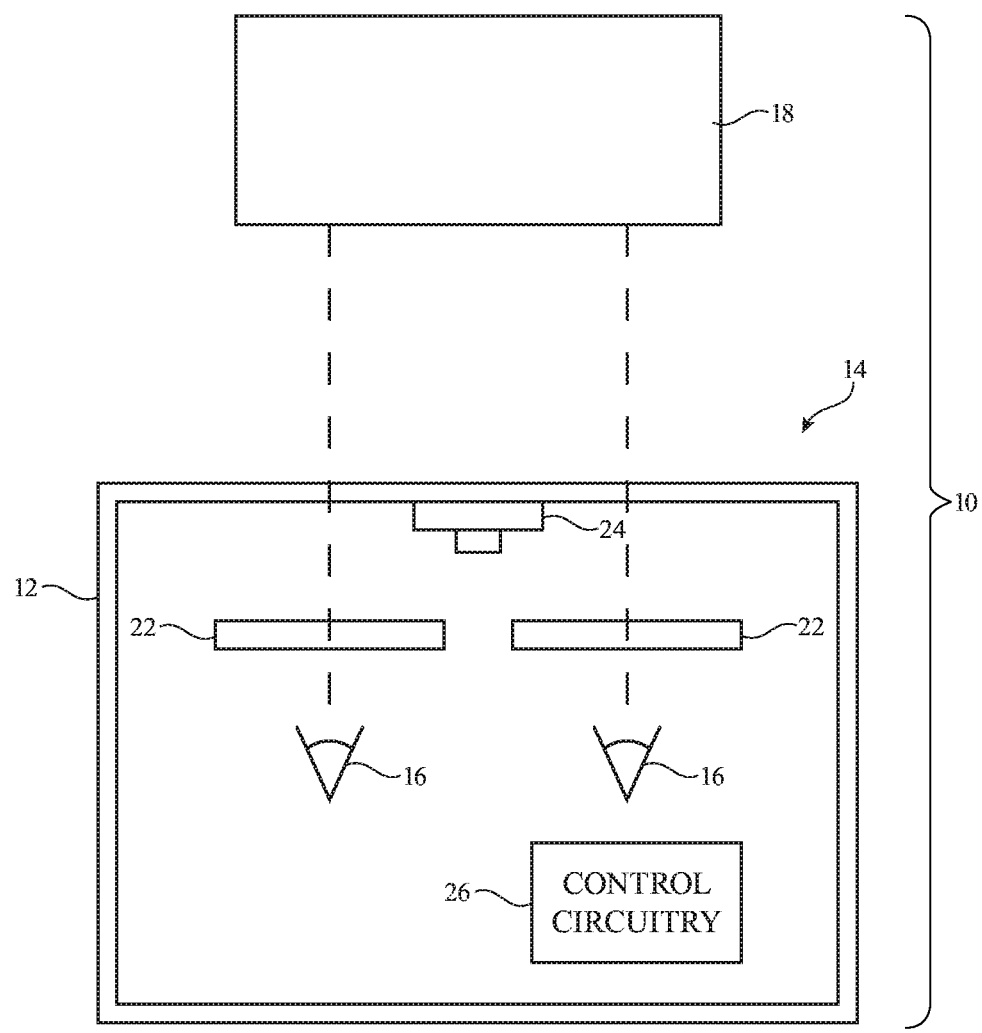
FIG. 1 is a diagram of illustrative system that includes eyeglasses with adjustable lenses in accordance with an embodiment.

An illustrative system having a device with one or more electrically adjustable optical elements is shown in FIG. 1. System 10 may include a head-mounted device such as eyeglasses 14 (sometimes referred to as glasses 14). Glasses 14 may include one or more optical systems such as adjustable lens components 22 mounted in a support structure such as support structure 12. Structure 12 may have the shape of a pair of eyeglasses (e.g., supporting frames), may have the shape of goggles, may form a housing having a helmet shape, or may have other configurations to help in mounting and securing the components of glasses 14 on the head of a user.

Adjustable lens components 22 may form lenses that allow a viewer (e.g., a viewer having eyes 16) to view external objects such as object 18 in the surrounding environment. Glasses 14 may include one or more adjustable lens components 22, each aligned with a respective one of a user's eyes 16. As an example, lens components 22 may include a left lens 22 aligned with a viewer's left eye and may include a right lens 22 aligned with a viewer's right eye. This is, however, merely illustrative. If desired, glasses 14 may include adjustable lens components 22 for a single eye.

Adjustable lenses 22 may be corrective lenses that correct for vision defects. For example, eyes 16 may have vision defects such as myopia, hyperopia, presbyopia, astigmatism, higher-order aberrations, and/or other vision defects. Corrective lenses such as lenses 22 may be configured to correct for these vision defects. Lenses 22 may be adjustable to accommodate users with different vision defects and/or to accommodate different focal ranges. For example, lenses 22 may have a first set of optical characteristics for a first user having a first prescription and a second set of optical characteristics for a second user having a second prescription. Glasses 14 may be used purely for vision correction (e.g., glasses 14 may be a pair of spectacles) or glasses 14 may include displays that display virtual reality or augmented reality content (e.g., glasses 14 may be a head-mounted display). In virtual reality or augmented reality systems, adjustable lens components 22 may be used to move content between focal planes from the perspective of the user. Arrangements in which glasses 14 are spectacles that do not include displays are sometimes described herein as an illustrative example.

Glasses 14 may include control circuitry 26. Control circuitry 26 may include processing circuitry such as microprocessors, digital signal processors, microcontrollers, baseband processors, image processors, application-specific integrated circuits with processing circuitry, and/or other processing circuitry and may include random-access memory, read-only memory, flash storage, hard disk storage, and/or other storage (e.g., a non-transitory storage media for storing computer instructions for software that runs on control circuitry 26).

Glasses 14 may include input-output circuitry such as eye state sensors, range finders disposed to measure the distance to external object 18, touch sensors, buttons, microphones to gather voice input and other input, sensors, and other devices that gather input (e.g., user input from viewer 16) and may include light-emitting diodes, displays, speakers, and other devices for providing output (e.g., output for viewer 16). Glasses 14 may, if desired, include wireless circuitry and/or other circuitry to support communications with a computer or other external equipment. If desired, a sensor system such as sensor system 24 may be used to gather input during use of glasses 14. Sensor system 24 may include an accelerometer, compass, an ambient light sensor or other light detector, a proximity sensor, a scanning laser system, and other sensors for gathering input during use of glasses 14. Sensor system 24 may be used to track a user's eyes 16. For example, sensor system 24 may include one or more digital image sensors, lidar (light detection and ranging) sensors, ultrasound sensors, or other suitable sensors for tracking the location of a user's eyes. As an example, sensor system 24 may be used by control circuitry 26 to gather images of the pupils and other portions of the eyes of the viewer. The locations of the viewer's pupils and the locations of the viewer's pupils relative to specular glints from light sources with known positions or the rest of the viewer's eyes may be used to determine the locations of the centers of the viewer's eyes (i.e., the centers of the user's pupils) and the direction of view (gaze direction) of the viewer's eyes. In some arrangements, sensor system 24 may include a wavefront sensor that measures the aberrations of a user's eyes. Control circuitry 26 may then adjust the optical properties of lens component 22 to correct the user-specific aberrations detected by the wavefront sensor.

Control circuitry 26 may also control the operation of optical elements such as adjustable lens components 22. Adjustable lens components 22, which may sometimes be referred to as adjustable lenses, adjustable lens systems, adjustable optical systems, adjustable lens devices, tunable lenses, etc., fluid-filled variable lenses, and/or may contain electrically adjustable material such as liquid crystal material, volume Bragg gratings, or other electrically modulated material that may be adjusted to produce customized lenses. Each of components 22 may contain an array of electrodes that apply electric fields to portions of a layer of liquid crystal material or other voltage-modulated optical material with an electrically adjustable index of refraction (sometimes referred to as an adjustable lens power or adjustable phase profile). By adjusting the voltages of signals applied to the electrodes, the index of refraction profile of components 22 may be dynamically adjusted. This allows the size, shape, and location of the lenses formed within components 22 to be adjusted.

Figure 2:
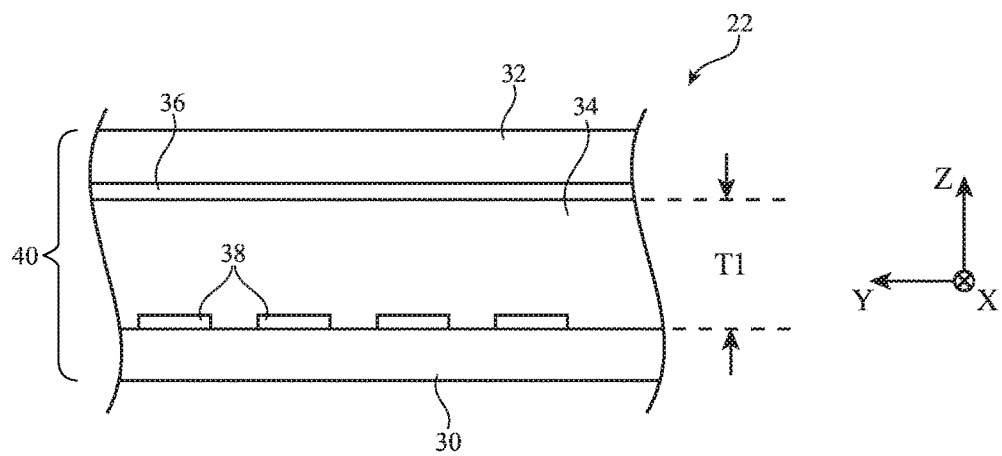
FIG. 2 is a cross-sectional side view of an illustrative liquid crystal cell that may be used to form an adjustable lens in accordance with an embodiment.

A cross-sectional side view of an illustrative adjustable lens component is shown in FIG. 2. As shown in FIG. 2, component 22 may include liquid crystal cell 40. Liquid crystal cell 40 may have a layer of voltage-modulated optical material such as liquid crystal layer 34. Liquid crystal layer 34 may be interposed between transparent substrates such as upper substrate 32 and lower substrate 30. Substrates 32 and 30 may be formed from clear glass, sapphire or other transparent crystalline material, cellulose triacetate, transparent plastic, or other transparent layers. Component 22 may have a pattern of electrodes that can be supplied with signals from control circuitry 26 to produce desired voltages on component 22. In the example of FIG. 2, these electrodes include elongated electrodes (e.g., strip-shaped electrodes) such as electrodes 38 on substrate 30 that run along the X dimension and a common electrode such as common electrode 36 on substrate 32 (e.g., a blanket layer of conductive material on substrate 32). Electrodes 36 and 38 may be formed from transparent conductive material such as indium tin oxide, conductive polymers such as poly(3,4-ethylenedioxythiophene) polystyrene sulfonate (PEDOT:PPS), or other transparent electrode structures and may be located on outer and/or inner surfaces of substrates 32 and 30.

At each location of electrode strips 38 in component 22, a desired voltage may be applied across liquid crystal layer 34 by supplying a first voltage to electrode 38 and a second voltage (e.g., a ground voltage) to common electrode 36. The liquid crystal between the two electrodes will receive an applied electric field with a magnitude that is proportional to the difference between the first and second voltages on the electrodes. By controlling the voltages on electrodes 38 and common electrode 36, the index of refraction of liquid crystal layer 34 of component 22 can be dynamically adjusted to produce customized lenses.

In the example of FIG. 2, strip-shaped electrodes 38 (sometimes referred to as finger electrodes) extend parallel to the X-axis. This allows the index-of-refraction profile (sometimes referred to as the phase profile) of liquid crystal cell 40 to be modulated in the Y-dimension by applying the desired voltages to each finger electrode 38.

When an electric field is applied to the liquid crystals of layer 34, the liquid crystals change orientation. The speed at which a given liquid crystal material can be reoriented is limited by factors such as the thickness of layer 34 (e.g., thickness T1 of FIG. 2, sometimes referred to as the cell gap). To increase the tuning speed of liquid crystal layer 34 while still achieving a suitable tuning range, adjustable lens component 22 may include two or more liquid crystal cells 40 stacked on top of one another. This type of arrangement is illustrated in FIG. 3.

Figure 3:
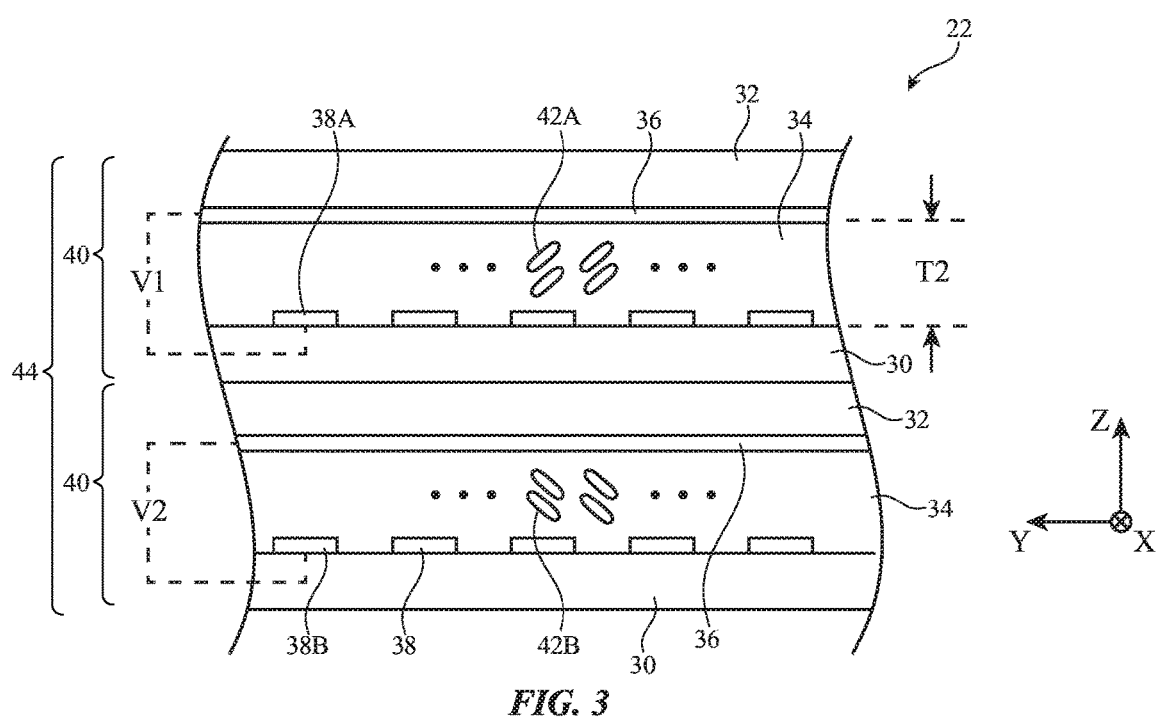
FIG. 3 is a cross-sectional side view of an illustrative liquid crystal module having first and second liquid crystal layers with antiparallel liquid crystal alignment orientations in accordance with an embodiment.

As shown in FIG. 3, adjustable lens component 22 may include liquid crystal module 44. Liquid crystal module 44 may include two or more liquid crystal cells 40. Each liquid crystal cell may include liquid crystal layer 34 interposed between upper substrate 32 and lower substrate 30. Finger electrodes 38 may be formed on each lower substrate 30 and may extend parallel to the X-axis. Common electrode 36 may be formed on each upper substrate 32. If desired, common voltage electrode 36 may be formed on lower substrate 30 and finger electrodes 38 may be formed on upper substrate 32. The example of FIGS. 2 and 3 is merely illustrative.

The cell gap of each liquid crystal cell 40 in module 44 may be less than that of liquid crystal cell 40 of FIG. 2. For example, liquid crystal layers 34 of module 44 in FIG. 3 may each have a thickness T2, which is less than thickness T1 of liquid crystal layer 34 in cell 40 of FIG. 2. The reduced cell gap increases the tuning speed of liquid crystal layers 34 while still maintaining satisfactory tuning range (sometimes referred to as lens power range).

If desired, the liquid crystal alignment orientation (sometimes referred to as a rubbing direction) of liquid crystal cells 40 in module 44 may be antiparallel. In particular, liquid crystal molecules 42A of upper liquid crystal cell 40 may have a first liquid crystal alignment orientation, and liquid crystal molecules 42B of lower liquid crystal cell 40 may have a second liquid crystal alignment orientation that is antiparallel to the first liquid crystal alignment orientation. This type of arrangement may help reduce the angle dependency of phase retardation in module 44.

At each location of finger electrode 38 in component 22, a desired voltage may be applied across each liquid crystal layer 34 by supplying a first voltage to finger electrode 38 and a second voltage (e.g., a ground voltage) to common electrode 36. The liquid crystal between the two electrodes will receive an applied electric field with a magnitude that is proportional to the difference between the first and second voltages on the electrodes. By controlling the voltages on electrodes 38 and common electrode 36, the index of refraction of each liquid crystal layer 34 of component 22 can be dynamically adjusted to produce customized lenses. Because finger electrodes 38 extend along the X-dimension, the phase profile of each liquid crystal cell 40 may be modulated in the Y-dimension by applying the desired voltages to each finger electrode 38.

Overlapping portions of the two liquid crystal layers 34 in module 44 may be controlled using the same or different voltages to achieve the desired index of refraction at that portion of module 44. For example, finger electrode 38A of upper liquid crystal cell 40 in module 44 may overlap finger electrode 38B of lower liquid crystal cell 40 in module 44. A first voltage V1 may be applied across a portion of upper liquid crystal layer 34 overlapping finger electrode 38A, and a second voltage V2 may be applied across a portion of lower liquid crystal layer 34 overlapping finger electrode 38B. Voltages V1 and V2 may be different or may be the same. Control circuitry 26 may determine the ratio of V1 to V2 based on the desired index of refraction at that portion of the liquid crystal module 44 and based on the disposition of the user's eyes 16.

Figure 4:
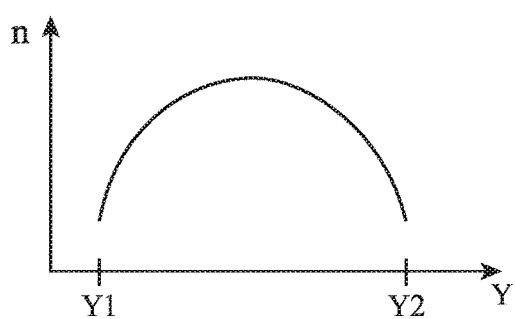
FIGS. 4 and 5 are graphs showing how an adjustable lens may be adjusted so that its refractive index varies as a function of position to produce a desired lens profile in accordance with an embodiment.
Figure 5:
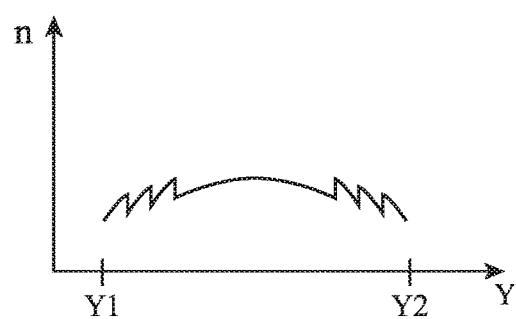

FIGS. 4 and 5 show examples of illustrative index-of-refraction profiles that may be generated by adjustable lens component 22 of FIG. 2 and/or by adjustable lens component 22 of FIG. 3. In the example of FIG. 4, refractive index n has been varied continuously between peripheral lens edges Y1 and Y2. In the example of FIG. 5, refractive index n has been varied discontinuously to produce an index-of-refraction profile appropriate for forming a Fresnel lens. These examples are merely illustrative. If desired, other suitable index-of-refraction profiles may be used using adjustable lens components of the type shown in FIGS. 2 and 3.

In the examples of FIGS. 2 and 3, adjustable lens component 22 includes electrodes that extend in one direction (e.g., the X-dimension of FIGS. 2 and 3), allowing adjustable lens component 22 to modulate the phase profile of component 22 along one direction (e.g., the Y-dimension of FIGS. 2 and 3). If desired, adjustable lens component 22 may include electrodes that extend in multiple directions, thus allowing adjustable lens component 22 to modulate the phase profile of component 22 along multiple directions.

Figure 6:
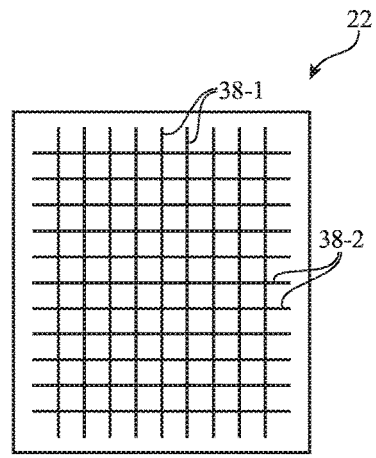
FIG. 6 is a top view of an illustrative adjustable lens component having arrays of electrodes that extend along first and second directions in accordance with an embodiment.

FIG. 6 is a top view of illustrative adjustable lens component 22 having first finger electrodes 38-1 oriented along a first direction and second finger electrodes 38-2 oriented along a second direction different from the first direction. First finger electrodes 38-1 may, for example, be oriented at 90-degree angles relative to second finger electrodes 38-2, or other suitable orientations may be used. Each set of electrodes may modulate the phase profile of a liquid crystal layer along an associated dimension. Adjustable lens component 22 of the type shown in FIG. 6 with two orientations of electrodes may therefore be used to create phase profiles that vary along two dimensions. For example, electrodes 38-1 may produce a first quadratic phase profile along a first dimension and electrodes 38-2 may produce a second quadratic phase profile along a second dimension, thus providing lens components 22 with a combined phase profile matching that of a crossed-cylinder lens, with a spherical profile where the cylinders overlap (as an example).

Figure 7:
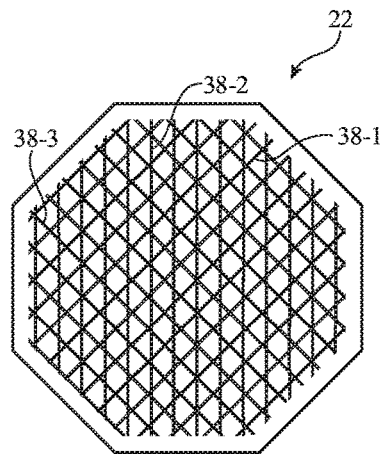
FIG. 7 is a top view of an illustrative adjustable lens component having arrays of electrodes that extend along first, second, and third directions in accordance with an embodiment.

FIG. 7 is a top view of an illustrative adjustable lens component 22 having first finger electrodes 38-1 oriented along a first direction, second finger electrodes 38-2 oriented along a second direction, and third finger electrodes 38-3 oriented along a third direction. Finger electrodes 38-1, 38-2, and 38-3 may, for example, be separated by 60-degree angles or may have other suitable orientations. Each set of electrodes may modulate the phase profile of a respective liquid crystal layer along an associated dimension. Adjustable lens components 22 of the type shown in FIG. 7 with three orientations of electrodes may therefore be used to create phase profiles that vary along three dimensions.

The examples of FIGS. 6 and 7 in which lens component 22 includes two and three orientations of electrodes, respectively, are merely illustrative. If desired, lens component 22 may include one, two, three, four, five, six, more than six, or any other suitable number of orientations of electrodes to enable lens component 22 to achieve different phase profiles across any suitable number of dimensions. Lens components 22 with multiple orientations of electrodes may be configured to simultaneously correct for optical aberrations such as defocus, astigmatism, coma, trefoil, spherical, and/or other aberrations. Arrangements in which adjustable lens components 22 include three orientations of electrodes are sometimes described herein as an illustrative example.

Figure 8:
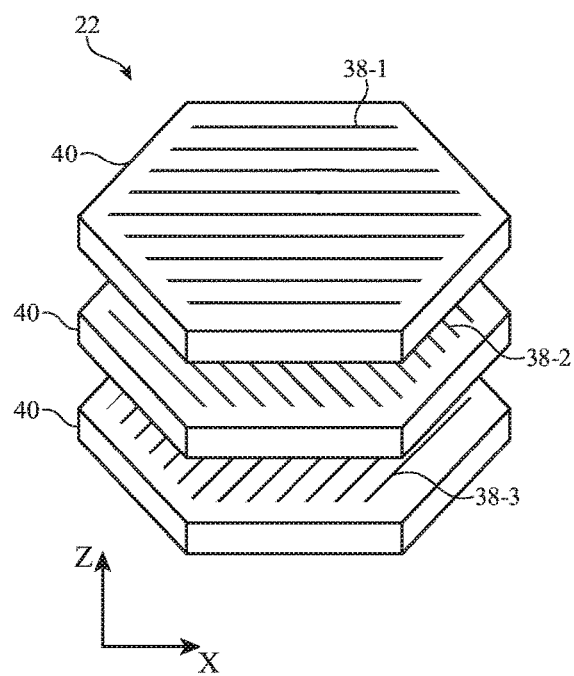
FIG. 8 is an exploded perspective view of an illustrative adjustable lens having first, second, and third liquid crystal cells, each with an associated orientation of electrodes, in accordance with an embodiment.
Figure 9:
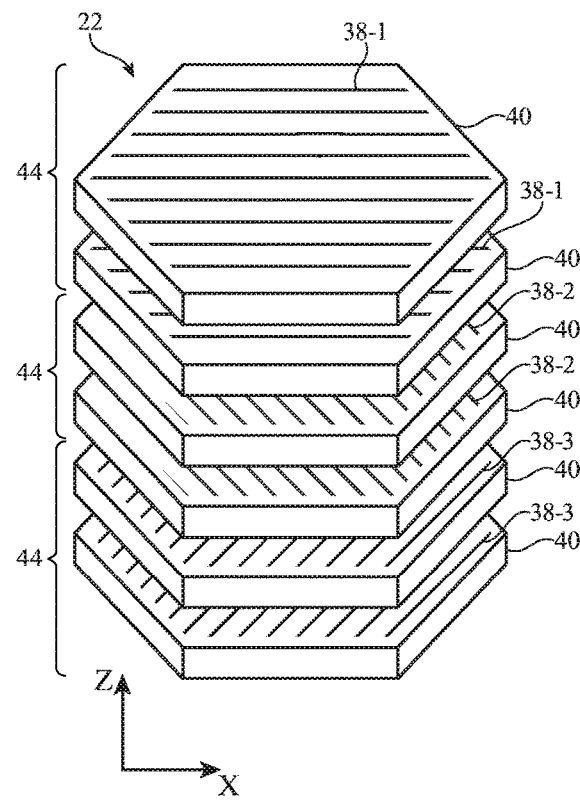
FIG. 9 is an exploded perspective view of an illustrative adjustable lens having first, second, and third liquid crystal modules, each with an associated orientation of electrodes, in accordance with an embodiment.

FIGS. 8 and 9 show exploded perspective views of illustrative lens components 22 with three orientations of electrodes. In the example of FIG. 8, adjustable lens components 22 include three liquid crystal cells 40. Each liquid crystal cell 40 may have a structure of the type described in connection with FIG. 2, with finger electrodes 38-1, 38-2, and 38-3 oriented along three different directions. For example, finger electrodes 38-1 may be oriented at 0 degrees relative to the X-axis, finger electrodes 38-2 may be oriented at 120 degrees relative to the X-axis, and finger electrodes 38-3 may be oriented at 60 degrees relative to the X-axis. This is merely illustrative, however. In general, electrodes 38-1, 38-2, and 38-3 may have any suitable orientation.

In the example of FIG. 9, adjustable lens components 22 include three liquid crystal modules 44. Each liquid crystal module 44 may have a structure of the type described in connection with FIG. 3. In particular, each liquid crystal module 44 may include an upper liquid crystal cell 40 and a lower liquid crystal cell 40. The liquid crystal layers of the upper and lower liquid crystal cells 40 may, if desired, have antiparallel liquid crystal alignment orientations. As shown in FIG. 9, finger electrodes 38-1, 38-2, and 38-3 of liquid crystal modules 44 are oriented along three different directions. For example, finger electrodes 38-1 may be oriented at 0 degrees relative to the X-axis, finger electrodes 38-2 may be oriented at 120 degrees relative to the X-axis, and finger electrodes 38-3 may be oriented at 60 degrees relative to the X-axis. This is merely illustrative, however. In general, electrodes 38-1, 38-2, and 38-3 may have any suitable orientation.

The foregoing examples in which lens components 22 have a rectangular shape (FIG. 6) or a hexagonal shape (FIGS. 7, 8, and 9) are merely illustrative. If desired, lens component 22 (e.g., substrate 30, substrate 32, liquid crystal layer 34, etc.) may have circular shapes, triangular shapes, pentagonal shapes, oval shapes, ergonomic shapes, convex shapes, or any other suitable shape. Arrangements in which lens components 22 are hexagonal are sometimes described herein as an illustrative example.

In some arrangements, control circuitry 26 may modulate the lens power across the entirety of each lens component 22. This type of arrangement may be useful in configurations where glasses 14 do not include sensor system 24 for eye tracking and/or when the tuning speed of lens components 22 is not sufficiently high to maintain focus when the user's eye moves. Modulating the lens power from edge to edge of components 22 may ensure that the image remains in focus even when the user's eye moves around.

In other arrangements, control circuitry 26 may modulate lens power across only a portion of lens component 22. This type of foveated lens arrangement is illustrated in FIG. 10.

Viewers are most sensitive to image detail in the main field of view. Peripheral regions of a lens may therefore be provided with a different phase profile than the region of the lens within the user's gaze. The peripheral regions of the lens that are outside of the viewer's gaze may, for example, be optically unmodulated, may be provided with a phase profile that is constant across a given area, and/or may be provided with a phase profile that is less spatially varied than the portion of the lens in the direction of the viewer's gaze. The regions of the lens outside of the user's gaze may have an optical power magnitude that is less than the optical power magnitude of the lens region within the user's gaze. By including lower power areas in a variable-power lens, total required variable phase depth and power consumption can be minimized and/or reduced. Further, magnification changes (which could be disorienting to the user) are experienced only over the area of the lens where focal power is modulated. Gaze detection data (e.g., gathered using sensor system 24) may be used in determining which portion of lens component 22 is being directly viewed by viewer 16 and should therefore have the optically appropriate prescription and which portions of lens components 22 are in the viewer's peripheral vision and could be left optically unmodulated or otherwise provided with a phase profile having less spatial variation than the portions of lens components 22 within the viewer's gaze.

As shown in FIG. 10, for example, adjustable lens component 22 may have an active area such as active area 48. Within active area 48, adjustable lens components 22 may include one or more materials having an electrically adjustable index of refraction (e.g., liquid crystal cells 40 of the type discussed in connection with FIGS. 2-9). Control circuitry 26 may dynamically adjust the phase profile of lens components 22. Active area 48 may include gaze area 46 and peripheral area 50. Gaze area 46 corresponds to the portions of lens components 22 that are within the user's gaze, whereas peripheral area 50 corresponds to the portions of lens components 22 that are outside of the user's gaze (e.g., portions of lens components 22 that are in the user's peripheral vision). Gaze area 46 of lens components 22 may be provided with a different phase profile than peripheral area 50. For example, gaze area 46 may be optically modulated to produce a first lens power, while peripheral area 50 may be left optically unmodulated, may be optically modulated to produce a second lens power magnitude that is less than the first lens power magnitude, and/or may be optically modulated to produce a phase profile that is less spatially varied than the phase profile of gaze area 46.

Control circuitry 26 may dynamically adjust the location, size, resolution, or shape of gaze area 46 and peripheral area 50 during operation of glasses 14. For example, control circuitry 26 may use sensor system 24 to track a user's gaze and may adjust the location of gaze area 46 so that it remains aligned with the user's gaze. If desired, the size of gaze area 46 may be based on the size of the foveal region in a user's eyes, the user's pupil diameter, and/or the desired phase profile for gaze area 46. Gaze area 46 may, for example, have a diameter between 4 mm and 9 mm, between 7 mm and 9 mm, between 6 mm and 10 mm, between 4 mm and 8 mm, between 8 mm and 12 mm, greater than 10 mm, less than 10 mm, or any other suitable size. The size of gaze area 46 may be based on a distance between lens components 22 and a user's eyes 16, may be based on the size of the user's pupil 52 (e.g., as measured with sensor system 24 or as inferred based on eye charts, ambient light levels, or other data), and/or may be based on other information.

In gaze area 46, control circuitry 26 may modulate the index of refraction of liquid crystal material 34 to obtain the desired lens power and the desired vision correction properties for the viewer. This may include, for example, controlling each finger electrode 38 independently or controlling small sets of finger electrodes 38 with common control signals. In peripheral area 50, control circuitry 26 may control larger sets of finger electrodes 38 with common control signals and/or may provide a ground or baseline voltage to finger electrodes 38 (e.g., may deactivate some finger electrodes 38). If desired, optical power may be constant across gaze area 46 and phase may be flat across peripheral area 50. In other suitable arrangements, optical power may be varied across gaze area 46 and/or peripheral area 50.

FIG. 11 is a top view of illustrative adjustable lens components 22 showing how areas of different optical power magnitude may be achieved. As shown in FIG. 11, adjustable lens components 22 may include gaze area 46 and peripheral area 50. Gaze area 46 may have a first lens power magnitude and peripheral area 46 may have a second lens power magnitude that is less than the first lens power magnitude. Gaze area 46 may, for example, align with the foveal region of a user's eyes 16 (as shown in FIG. 10). Electrodes that overlap (i.e., pass through) gaze area 46 such as electrodes 38-1, 38-2, and 38-3 may be controlled to make a desired prescription within gaze area 46 and electrodes that do not pass through gaze area 46 (not shown in FIG. 11) may be controlled to produce a spatially constant phase or a phase that otherwise has less spatial variation than that of gaze area 46.

Control circuitry 26 may dynamically adjust the location of gaze area 46 based on gaze location information from sensor system 24 by actively identifying which electrodes are within a user's gaze and which electrodes are outside of a user's gaze. Electrodes within a user's gaze (e.g., in area 46) may be operated in optically modulated mode, and electrodes outside of the user's gaze (e.g., in area 50) may be operated in constant phase mode or may otherwise be operated to produce a phase profile with less spatial variation than that of gaze area 46.

Whereas lens components with only two different electrode orientations (e.g., lens component 22 of FIG. 6) may be capable of expressing spherical profiles and correcting one of two modes of astigmatism, lens components with three or more electrode orientations may be capable of expressing a greater number of different types of phase profiles (to correct higher order aberrations, astigmatism with any rotational axis, coma, spherical aberration, etc.). Additionally, using more than two electrode orientations may help ease the transition between gaze region 46 (e.g., where the phase profile of liquid crystal layer 34 is actively controlled) and peripheral region 50 (e.g., where the phase profile of liquid crystal layer 34 is not actively controlled).

It may be desirable to form finger electrodes with a relatively fine pitch. If care is not taken, large gaps between adjacent finger electrodes 38 can lead to optical defects such as unwanted diffraction and phase profile imperfections. FIG. 12 shows an illustrative arrangement for obtaining closely spaced finger electrodes 38. As shown in FIG. 12, finger electrodes 38 may receive control signals from control signal lines 56. The spacing between adjacent control signal lines 56 may be greater than the spacing between finger electrodes 38. Each control signal line 56 may provide an associated voltage (e.g., V1, V2, V3, etc.) to conductive electrodes 38 through a resistive strip 54. Resistive strip 54 may be formed from a conductive material such as transparent conductive material (e.g., indium tin oxide), metal (e.g., tungsten, gold, silver, or other suitable metals), polysilicon, or other conductive material. Resistive strip 54 may have distributed resistance levels that vary along length L. Resistive strip 54 may take a serpentine path or a straight path, as illustrated in FIG. 12. Resistive strip 54 electrically couples control signal lines 56 to finger electrodes 38 and helps distribute control signals to the array of finger electrodes 38. Due to the resistance of strip 54, the voltage applied to electrodes 38 varies (e.g., varies linearly) from V1 to V2, from V2 to V3, etc. For example, an electrode 38 half way between control signal line 56 providing voltage V1 and control signal line 56 providing voltage V2 may receive a voltage that is halfway between voltages V1 and V2.

FIG. 13 is a top view of lens components 22 showing how resistive strip 54 may be located at one or more edges of the lens. For example, first and second strips may be coupled to first and second opposing ends of finger electrodes 38 to drive finger electrodes 38 from both sides. This is, however, merely illustrative. If desired, strip 54 may only be located on one side of lens 22, may be located on three or more sides of lens 22, or may extend continuously around the perimeter of lens 22. Resistive strip 54 may, for example, be formed on each substrate 30 in lens 22 to distribute control signals to each orientation of electrodes 38.

Control circuitry 26 may provide control signals to control signal lines 56, which may in turn apply voltages to finger electrodes 38 through resistive strip 54. Control circuitry 26 may include one or more integrated circuits mounted directly to lens 22 (e.g., in a chip-on-glass arrangement) or may include one or more integrated circuits mounted to a separate substrate and coupled to lens 22 through one or more flex circuits or other types of paths.

Figure 14:
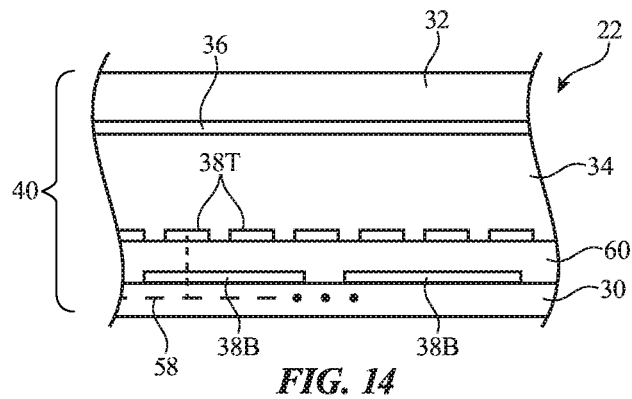
FIG. 14 is a cross-sectional side view of an illustrative liquid crystal cell having staggered top and bottom electrodes that are driven with common control signals in accordance with an embodiment.
Figure 15:
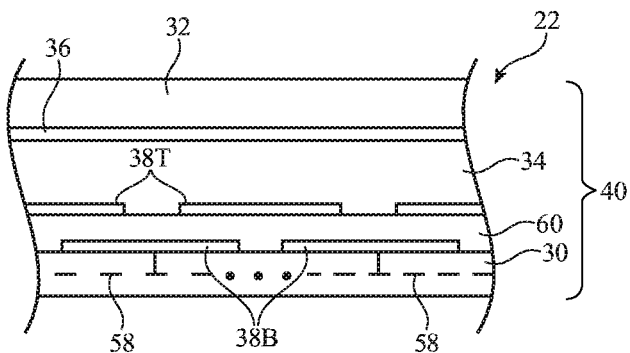
FIG. 15 is a cross-sectional side view of an illustrative liquid crystal cell having staggered top and bottom electrodes, where the top electrodes are floating electrodes and the bottom electrodes are driven with control signals, in accordance with an embodiment.
Figure 16:
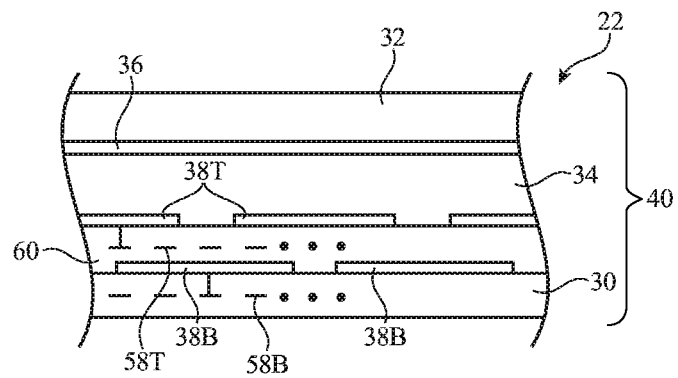
FIG. 16 is a cross-sectional side view of an illustrative liquid crystal cell having staggered top and bottom electrodes that are driven independently of one another in accordance with an embodiment.

FIGS. 14, 15, and 16 show other ways of mitigating optical effects that may arise from the existence of gaps between finger electrodes 38.

As shown in FIG. 14, finger electrodes 38 include top finger electrodes 38T and bottom finger electrodes 38B. An insulating layer such as insulator 60 (e.g., a layer of inorganic material such as silicon nitride or other suitable material) may be interposed between top electrodes 38T and bottom electrodes 38B. Electrodes 38T and 38B may be staggered relative to one another such that gaps between top electrodes 38T are overlapped by bottom electrodes 38B, and gaps between bottom electrodes 38B are overlapped by top electrodes 38T. In the example of FIG. 14, both top electrodes 38T and bottom electrodes 38B are controlled together using the same control signal via conductive path 58.

In the example of FIG. 15, top electrodes 38T are staggered relative to bottom electrodes 38B, but only one set of electrodes is driven and the other set is left floating. For example, top electrodes 38T may be floating electrodes (e.g., not electrically connected to a voltage supply), and bottom electrodes 38B may be driven using control signals via conductive path 58. In the configuration of FIG. 15, insulator 60 may be chosen such that it is slightly conductive such that any static charge that accumulates on top electrodes 38T has a high-resistance path to ground.

In the example of FIG. 16, top electrodes 38T and bottom electrodes 38B are independently controlled. Top electrodes 38T may be driven with control signals via conductive path 58T, whereas bottom electrodes 38B may be driven with control signals via conductive path 58B.

Figure 17:
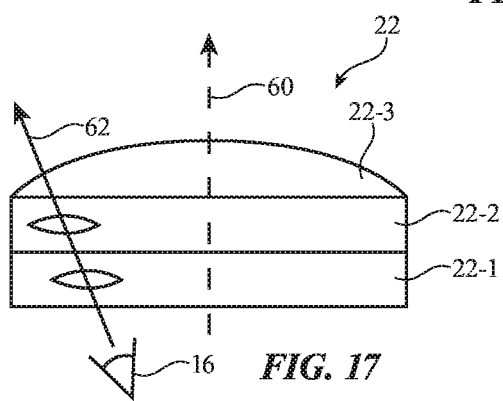
FIG. 17 is a cross-sectional side view of illustrative adjustable lens components having adjustable lenses that compensate for lens tilt in a fixed lens in accordance with an embodiment.

If desired, adjustable lens components may be stacked with fixed lens components. As shown in FIG. 17, for example, adjustable lens component 22 may include first lens 22-1, second lens 22-2, and third lens 22-3. Lenses 22-1 and 22-2 may be adjustable lens components each having a structure of the type described in connection with FIGS. 1-16. Lens 22-3 may be a fixed lens component. This type of arrangement may be used to modify the overall optical power of lens components 22. For example, adjustable lenses 22-1 and 22-2 may each have a lens power ranging from −1 diopter to +1 diopter and fixed lens 22-3 may be a fixed corrector optic having a lens power of +2 diopter. Combinations of fixed correctors can also serve to reduce the angle of traversal of light through the adjustable lens component, which may perform better when angles of traversal are closer to the normal axis. In this example, the combined optical power of lens component 22 would be 0 diopter to +4 diopter. This is merely illustrative, however. In general, any suitable number of adjustable lens components may be combined with any suitable fixed lens optic to achieve the desired lens power range.

If desired, adjustable lens component 22 may be used in conjunction with a progressive lens. This type of arrangement may serve to reduce the optical power needed from adjustable lens component 22.

In arrangements of the type shown in FIG. 17 where adjustable lens components 22 include both adjustable and fixed lenses, the adjustable lenses may be used to compensate for aberrations associated with fixed lens 22-3, such as lens tilt. As shown in FIG. 17, for example, a viewer's eyes 16 may view objects in direction 62, which is offset from optical axis 60 of fixed lens 22-3, causing lens tilt (e.g., an effect in which the position of the focal point shifts). Control circuitry 26 may be configured to adjust the centers and phase profiles of adjustable lenses 22-1 and 22-2 to compensate for the lens tilt aberration of fixed lens 22-3.

Figure 18:
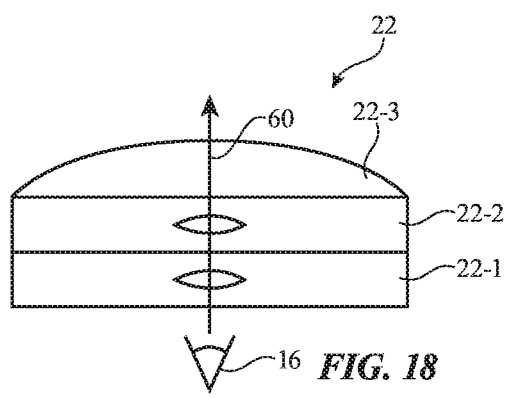
FIG. 18 is a cross-sectional side view of illustrative adjustable lens components having adjustable lenses stacked with a fixed lens in accordance with an embodiment.

In the example of FIG. 18, control circuitry 26 may detect that the user's gaze is aligned with optical axis 60 of fixed lens 22-3, so no tilt correction may be needed from adjustable lenses 22-1 and 22-2.

If desired, adjustable lens components 22 may be configured to zoom (e.g., magnify). For example, control circuitry 26 may adjust the phase profile of adjustable lens 22-1 to mimic a concave lens and may adjust the phase profile of adjustable lens 22-2 to mimic a convex lens. The convex lens may converge light rays onto the concave lens, which then spreads the rays out to create a magnified image for the user's eyes 16.

If desired, adjustable lens components 22 may include multiple liquid crystal cells 40. In general, a greater number of liquid crystal cells 40 in adjustable lens component 22 will lead to greater variable phase depth, the ability to correct higher-order aberrations, and the ability to modulate multiple polarization angles. Greater variable phase depth may in turn allow for a greater dioptric range and the ability to control a larger gaze area 46 using a smaller voltage range.

As described in connection with FIGS. 6 and 7, the use of multiple liquid crystal cells 40 in adjustable lens components 22 allows for multiple orientations of electrodes (e.g., finger electrodes 38). In general, a greater number of electrode orientations will allow lens component 22 to correct more higher-order aberrations using a smaller voltage range.

In some arrangements, each liquid crystal cell 40 in an adjustable lens component 22 may have a different electrode orientation. When no two liquid crystal cells 40 in lens component 22 share the same electrode orientation, incidental refractive effects radiating from the actively controlled gaze region 46 may be more spread out and therefore less perceivable to the user.

Figure 19:
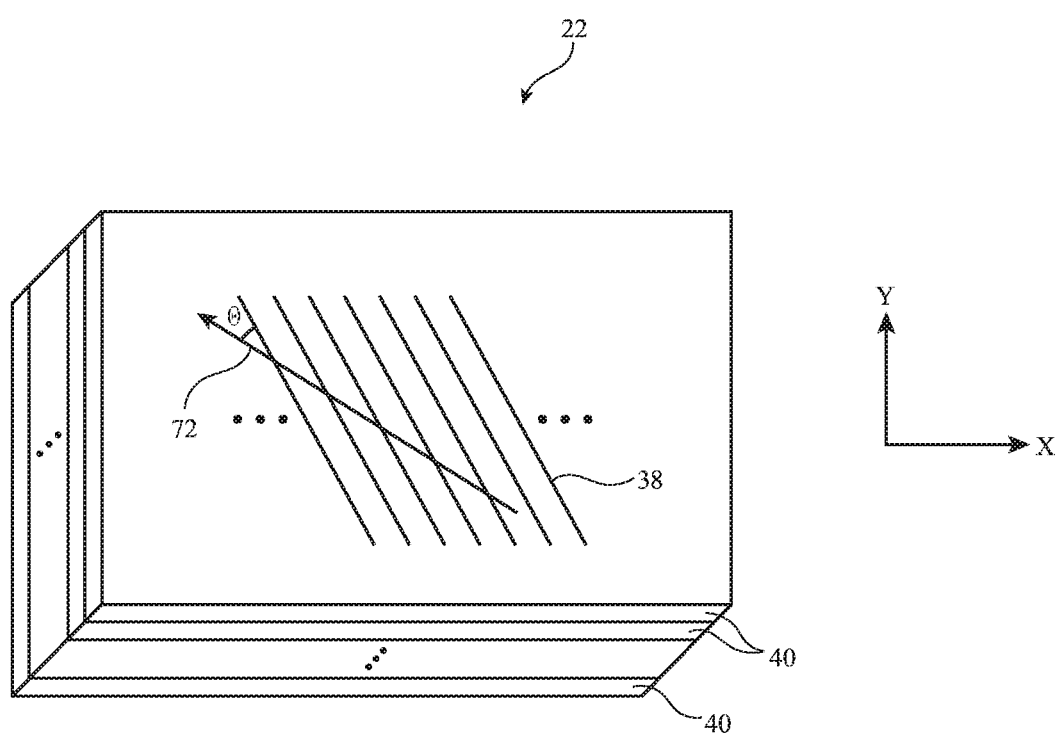
FIG. 19 is a perspective view of an illustrative adjustable lens component with multiple liquid crystal cells each having a unique electrode orientation in accordance with an embodiment.

FIG. 19 shows an example of an illustrative adjustable lens component 22 with multiple unique electrode orientations. As shown in FIG. 19, adjustable lens component 22 may include multiple liquid crystal cells 40. Each liquid crystal cell 40 may include finger electrodes 38 with a given orientation. The orientation of electrodes 38 in each cell 40 may be different from the orientation of electrodes 38 of every other cell 40 in lens component 22.

If desired, the orientation of electrodes 38 in each cell 40 may, if desired, be offset from the liquid crystal alignment orientation (e.g., liquid crystal alignment orientation 72) of liquid crystal layer 34 in cell 40. In particular, electrodes 38 may be oriented at an angle θ (e.g., a non-zero angle) relative to liquid crystal alignment orientation 72. It may also be beneficial to ensure that electrodes 38 are oriented at angles θ other than 90 degrees relative to the liquid crystal alignment orientation of liquid crystal layer 34. Avoiding zero degree and 90 degree angles between electrodes 38 and liquid crystal alignment orientation 72 may ensure that liquid crystal molecules twist uniformly in a particular direction in response to an applied electric field (rather than some liquid crystal molecules twisting in one direction while other liquid crystal molecules twist in a different direction, which can result in visual artifacts at the boundaries between the two twist directions). This is merely illustrative, however. If desired, electrodes 38 may be oriented at 0 degrees or 90 degrees relative to liquid crystal alignment orientation 72.

In some arrangements, adjustable lens components 22 may be used to modulate different linear polarizations. As shown in FIG. 20, for example, one or more liquid crystal cells 40 in lens component 22 may modulate light of a first polarization 70A, and one or more liquid crystal cells in lens component 22 may modulate light of a second polarization 70B. In one illustrative example, first polarization 70A may be angled at 135 degrees relative to the X-axis of FIG. 20 and second polarization 70B may be angled at 45 degrees relative to the X-axis of FIG. 20. With this arrangement, horizontally and vertically polarized light (e.g., light emitted from liquid crystal displays) may be equally modulated by each pair of liquid crystal cells 40 containing polarization 70A and polarization 70B. This is, however, merely illustrative. If desired, lens component 22 may modulate more than two polarizations, may modulate only one polarization, and/or may modulate other polarization angles (e.g., in addition to or instead of the polarization angles of FIG. 20). Arrangements in which lens component 22 modulates polarization 70A and polarization 70B are sometimes described herein as an illustrative example.

The polarization modulated by a given liquid crystal cell 40 may be determined by its liquid crystal alignment orientation. To modulate polarization 70A, liquid crystal cell 40 may have liquid crystal alignment orientation 72A1 of FIG. 21 (e.g., a liquid crystal alignment orientation oriented at 135 degrees relative to the X-axis of FIG. 21) or liquid crystal alignment orientation 72A2 of FIG. 22 (e.g., a liquid crystal alignment orientation antiparallel to liquid crystal alignment orientation 72A1). To modulate polarization 70B, liquid crystal cell 40 may have liquid crystal alignment orientation 72B1 of FIG. 23 (e.g., a liquid crystal alignment orientation oriented at 45 degrees relative to the X-axis of FIG. 23) or liquid crystal alignment orientation 72B2 of FIG. 24 (e.g., a liquid crystal alignment orientation antiparallel to liquid crystal alignment orientation 72B1).

In arrangements where adjustable lens component 22 of the type shown in FIG. 20 modulates multiple polarizations (e.g., polarizations 70A and 70B of FIG. 20), it may be desirable to alternate between polarizations from one liquid crystal cell to the next. It may also be desirable to alternate between liquid crystal alignment orientations.

For example, in arrangements where component 22 of FIG. 19 includes eight liquid crystal cells 40, the top cell 40 may modulate polarization 70A, may have liquid crystal alignment orientation 72A1, and may have electrodes 38 oriented at 11.25° relative to liquid crystal alignment orientation 72A1; the second cell 40 may modulate polarization 70B, may have liquid crystal alignment orientation 72B1, and may have electrodes 38 oriented at 33.75° relative to liquid crystal alignment orientation 72A1; the third cell 40 may modulate polarization 70A, may have liquid crystal alignment orientation 72A2, and may have electrodes 38 oriented at 56.25° relative to liquid crystal alignment orientation 72A1; the fourth cell 40 may modulate polarization 70B, may have liquid crystal alignment orientation 72B2, and may have electrodes 38 oriented at 78.75° relative to liquid crystal alignment orientation 72A1; the fifth cell 40 may modulate polarization 70A, may have liquid crystal alignment orientation 72A1, and may have electrodes 38 oriented at 101.25° relative to liquid crystal alignment orientation 72A1; the sixth cell 40 may modulate polarization 70B, may have liquid crystal alignment orientation 72B1, and may have electrodes 38 oriented at 123.75° relative to liquid crystal alignment orientation 72A1; the seventh cell 40 may modulate polarization 70A, may have liquid crystal alignment orientation 72A2, and may have electrodes 38 oriented at 146.25° relative to liquid crystal alignment orientation 72A1; and the eighth cell 40 may modulate polarization 70B, may have liquid crystal alignment orientation 72B2, and may have electrodes 38 oriented at 168.75° relative to liquid crystal alignment orientation 72A1.

The use of an even number of liquid crystal cells 40 for each polarization state may permit equal complements of the two antiparallel liquid crystal alignment orientations modulating a particular polarization. For example, in the eight-cell example just described, the first and fifth cell pair (with liquid crystal alignment orientation 72A1 and modulating polarization angle 70A) and the third and seventh cell pair (with liquid crystal alignment orientation 72A2 and modulating polarization angle 70A) are each individually able to express spherical power where they intersect. This in turn allows component 22 to express a variable fraction of the spherical power preferentially in either of the two antiparallel liquid crystal alignment orientations (which may be useful in situations where the viewing angle is such that one liquid crystal alignment orientation performs better than the other antiparallel liquid crystal alignment orientation).

The eight-cell example is merely illustrative. If desired, there may be greater or fewer than eight liquid crystal cells 40 in lens component 22. The same principals of evenly spaced electrode orientations, alternating polarizations from one cell to the next, and alternating liquid crystal alignment orientations may be applied, if desired. In the eight-cell example, the eight orientations of electrodes 38 are evenly spaced at 22.5° intervals. In a lens component 22 with 4N liquid crystal cells 40, the angular spacing between electrode orientations may be 180°/(4N). If N is greater than two, then each antiparallel liquid crystal alignment orientation may be able to express spherical power in the actively controlled gaze region 46. Each of two linear polarizations may be modulated by 2N cells, with an equal and alternating selection from the two possible antiparallel liquid crystal alignment orientations that modulate that polarization. In the eight-cell example described above, N=2. If desired, N may be 3, 6, or any other suitable number).

In arrangements where lens component 22 only modulates one linear polarization, only 2N liquid crystal cells 40 may be needed, the angular spacing between electrode orientations may be 180°/(2N), and cells can alternate between the two antiparallel liquid crystal alignment orientations for that polarization. These examples are merely illustrative, however. If desired, other arrangements and combinations of polarizations, liquid crystal alignment orientations, and electrode orientations may be used.

For example, lens component 22 may have 12 liquid crystal cells 40 and may modulate two polarizations (e.g., lens component 22 may have 4N liquid crystal cells 40 where N=3). In another suitable arrangement, lens component 22 may have 12 liquid crystal cells 40 and may modulate one polarization (e.g., lens component 22 may have 2N liquid crystal cells 40 where N=6). In these examples, the angular spacing between the electrode orientations may be 15° or other suitable angle. If desired a minimum angle (e.g., 7.5° or other suitable angle) between any liquid crystal alignment orientation and any electrode orientation may be imposed to avoid nonuniform twisting of liquid crystal molecules.

In arrangements where lens component 22 includes multiple liquid crystal cells 40, it may be desirable to use a flexible substrate (e.g., for substrate 30 and/or substrate 32 in each cell 40). For example, substrate 30 and/or substrate 32 may be formed from flexible materials such as a flexible polymer (e.g., polyimide or other suitable polymer), cellulose triacetate (TAC), or other suitable flexible material. The use of a flexible substrate in liquid crystal cells 40 may allow for thinner substrates (e.g., 40 microns or other suitable thickness) that are still robust. Additionally, flexible substrates can be deformed or bent in one or more dimensions, which may allow lens component 22 to be embedded in or laminated to a standard lens in eyeglasses with a meniscus shape (e.g., convexo-concave eyeglasses or other contoured eyeglasses).

Flexible substrates may also alleviate the challenge of electrically interfacing with each liquid crystal cell 40 in lens component 22. For example, multiple liquid crystal cells 40 in lens component may share a common pair of substrates formed from flexible material that has been bent and folded.

FIG. 25 shows an example of an illustrative lens component 22 with twelve liquid crystal cells 40 that share a common pair of flexible substrates. For example, first and second sheets of flexible material 88 may be used to form substrates 30 and 32, respectively, of liquid crystal cells 40-1, 40-2, 40-3, 40-4, 40-5, 40-6, 40-7, 40-8, 40-9, 40-10, 40-11, and 40-12 of adjustable lens component 22. By cutting flexible material 88 along the solid lines of FIG. 25 and folding flexible material 88 along the dashed lines of FIG. 25, the 12 liquid crystal cells 40 may be stacked to form lens component 22, as shown in the lower portion of FIG. 25. Prior to folding flexible material 88, a single rubbing process may be performed, such that all liquid crystal cells 40 have liquid crystal alignment orientation 72 prior to folding. After being cut and folded, lens component 22 may modulate light of two polarizations (e.g., polarizations 70A and 70B of FIG. 20), with two antiparallel liquid crystal alignment orientations for each polarization. Additionally, electrodes 38 in each of the twelve liquid crystal cells 40 may be oriented such that the twelve liquid crystal cells 40 have twelve distinct electrode orientations after lens component 22 is folded.

The fact that all twelve liquid crystal cells 40 share a common pair of flexible substrates may simplify electrical connections, allowing conductive traces to pass through some or all of the twelve cells to couple to pad 86 (e.g., where lens component 22 is coupled to external circuitry). If desired, angled edge 90 may be located adjacent to the bridge of a user's nose when worn by the user.

FIG. 26 shows another illustrative geometry that may be used for lens component 22. As in the example of FIG. 25, lens component 22 of FIG. 26 includes twelve liquid crystal cells 40, which may include substrates 30 and 32 formed from common sheets of flexible material 88. Flexible material 88 may be cut along the solid lines of FIG. 26 and folded along the dashed lines of FIG. 26 to form a stack of twelve liquid crystal cells 40. Prior to being folded, a single rubbing process may be used so that all cells 40 initially have liquid crystal alignment orientation 72. After being cut and folded, lens component 22 may modulate light of two polarizations (e.g., polarizations 70A and 70B of FIG. 20), with two antiparallel liquid crystal alignment orientations for each polarization. Additionally, electrodes 38 in each of the twelve liquid crystal cells 40 may be oriented such that the twelve liquid crystal cells 40 have twelve distinct electrode orientations after lens component 22 is folded.

The fact that all twelve liquid crystal cells 40 share a common pair of flexible substrates may simplify electrical connections, allowing conductive traces to pass through some or all of the twelve cells to couple to pad 86 (e.g., where lens component 22 is coupled to external circuitry). In the example of FIG. 26, lens component 22 has first and second pads 86. When lens component 22 is cut and folded, first and second pads 86 may be located on opposite sides of lens component 22. Additionally, the use of first and second pads 86 helps simplify electrical connections to the twelve cells 40. A first set of traces 96 may couple the top six cells 40 to one pad 86, while a second set of traces 96 may couple the bottom six cells 40 to the other pad 86.

The examples of FIGS. 25 and 26 are merely illustrative. If desired, other geometries and folding arrangements may be used, and/or component 22 may include more or less than twelve liquid crystal cells 40.

Figure 27:
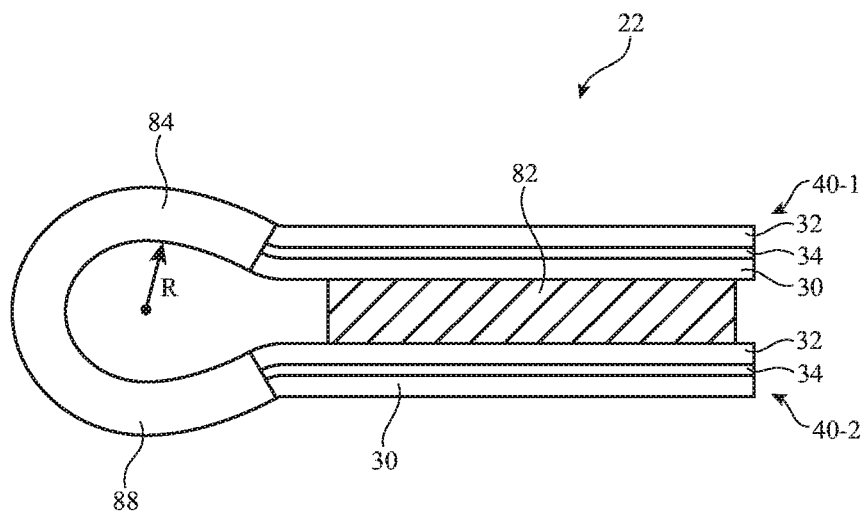
FIG. 27 is a cross-sectional side view of an illustrative adjustable lens component in which multiple liquid crystal cells share a pair of flexible substrates that are laminated together in accordance with an embodiment.

FIG. 27 is a cross-sectional side view of an illustrative lens component 22 showing how a pair of liquid crystal cells 40 may share substrates formed from sheets of flexible material 88. As shown in FIG. 27, liquid crystal cell 40-1 and liquid crystal cell 40-2 each have substrates 30 and 32. Substrate 30 and/or substrate 32 may be formed form a common sheet of flexible material 88 that is shared between liquid crystal cell 40-1 and liquid crystal cell 40-2. The sheets of flexible material 88 may have a bend region 84 between the two liquid crystal cells. If desired, a minimum bend radius R may be imposed to reduce the mechanical stress on signal lines in bend region 88. To provide additional mechanical stability to lens component 22, an adhesive layer such as optically clear adhesive 82 may be used to laminate adjacent liquid crystal cells 40-1 and 40-2. If desired, liquid crystal cells 40 in lens component 22 may be planar (as shown in the example of FIG. 27), or liquid crystal cells 40 may be curved.

Figure 28:
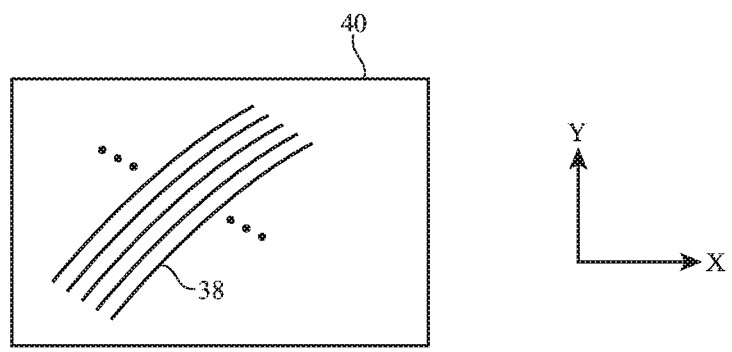
FIG. 28 is a top view of an illustrative liquid crystal cell having a slightly distorted electrode pattern to reduce visibility of artifacts arising from unwanted diffraction in accordance with an embodiment.

In some arrangements, finger electrodes 38 in a given liquid crystal cell 40 may be strictly parallel to one another. In other arrangements, finger electrodes 38 may follow slightly distorted paths (e.g., paths that are not strictly parallel to one another). An example of this type of arrangement is illustrated in FIG. 28. As shown in FIG. 28, electrodes 38 may deviate from a strictly parallel arrangement (e.g., electrodes 38 may have slightly different angles relative to the X-axis of FIG. 28). This type of arrangement may help reduce the visibility of artifacts that can arise from unwanted diffraction of light passing through liquid crystal cell 40. If desired, the deviation of electrodes 38 (e.g., the angle between any one electrode 38 in cell 40 and any other electrode 38 in cell 40) may be smaller than the difference between the angle of electrodes 38 and liquid crystal alignment orientation 72, which may help avoid discontinuities in the twist direction of liquid crystal molecules in cell 40.

The foregoing is merely illustrative and various modifications can be made to the described embodiments. The foregoing embodiments may be implemented individually or in any combination.

What is claimed is:

1. Eyeglasses configured to be worn by a user, the eyeglasses comprising:
    control circuitry;
    a sensor system that tracks the user's gaze; and
    at least one adjustable lens that aligns with a respective one of the user's eyes, wherein the at least one adjustable lens comprises:
        first, second, and third layers of voltage-modulated optical material, wherein each of the first, second, and third layers of voltage-modulated optical material comprises a first portion that is within the user's gaze and a second portion that is outside of the user's gaze; and
        first, second, and third arrays of electrodes that respectively adjust phase profiles of the first, second, and third layers of voltage-modulated optical material, wherein the first, second, and third arrays of electrodes have different orientations, and wherein the control circuitry uses information from the sensor system to control the first, second, and third arrays of electrodes to adjust a phase profile of the first portion of each of the first, second, and third layers of voltage-modulated optical material without adjusting a phase profile of the second portion of each of the first, second, and third layers of voltage-modulated optical material.

2. The eyeglasses defined in claim 1 wherein the control circuitry uses the information from the sensor system to identify a first group of electrodes in the first, second, and third arrays of electrodes that are within the user's gaze and a second group of electrodes in the first, second, and third arrays of electrodes that are outside of the user's gaze, and wherein the control circuitry applies control signals to the first group of electrodes without applying control signals to the second group of electrodes.

3. The eyeglasses defined in claim 1 wherein the voltage-modulated optical material in the first, second, and third layers of voltage-modulated optical material comprises liquid crystal material and wherein the electrodes in the first, second, and third arrays of electrodes comprise elongated strips of indium tin oxide.

4. The eyeglasses defined in claim 3 further comprising first, second, and third common voltage electrodes, wherein the first layer of voltage-modulated optical material is interposed between the first common voltage electrode and the first array of electrodes, wherein the second layer of voltage-modulated optical material is interposed between the second common voltage electrode and the second array of electrodes, wherein the third layer of voltage-modulated optical material is interposed between the third common voltage electrode and the third array of electrodes.

5. The eyeglasses defined in claim 1 further comprising:
    control signal lines that distribute control signals to the first array of electrodes.

6. The eyeglasses defined in claim 5 further comprising:
    first and second transparent substrates on opposing sides of the first layer of voltage-modulated optical material; and
    a strip of conductive material formed along an edge of the first substrate, wherein the strip of conductive material has a distributed resistance.

7. The eyeglasses defined in claim 6 wherein the strip of conductive material is electrically coupled between the control signal lines and the first array of electrodes.

8. The eyeglasses defined in claim 7 wherein the first array of electrodes has a first pitch and wherein the control signal lines have a second pitch that is larger than the first pitch.

9. The eyeglasses defined in claim 1 wherein the first array of electrodes comprises top and bottom electrodes separated by an insulator and wherein the top electrodes are staggered relative to the bottom electrodes.

10. The eyeglasses defined in claim 9 wherein the control circuitry applies control signals to the top and bottom electrodes.

11. The eyeglasses defined in claim 9 wherein the top electrodes are floating electrodes and the control circuitry applies the control signals to the bottom electrodes.

12. Eyeglasses configured to be worn by a user, comprising:
    control circuitry; and
    at least one adjustable lens that aligns with a respective one of the user's eyes, wherein the at least one adjustable lens comprises:
        a first liquid crystal module having a first array of electrodes oriented along a first direction;
        a second liquid crystal module having a second array of electrodes oriented along a second direction; and
        a third liquid crystal module having a third array of electrodes oriented along a third direction, wherein the first, second, and third directions are different.

13. The eyeglasses defined in claim 12 wherein each of the first, second, and third liquid crystal modules comprise:
    a first liquid crystal cell having a first liquid crystal alignment orientation; and
    a second liquid crystal cell having a second liquid crystal alignment orientation that is antiparallel to the first liquid crystal alignment orientation.

14. The eyeglasses defined in claim 12 further comprising a sensor system that tracks a user's gaze, wherein the at least one adjustable lens comprises:
    a first region having a first optical power; and
    a second region having a second optical power that is lower in magnitude than the first optical power, wherein the control circuitry adjusts a location of the first region so that it remains aligned with the user's gaze.

15. The eyeglasses defined in claim 14 wherein the first region has a diameter between 4 mm and 9 mm.

16. Eyeglasses configured to be worn by a user, comprising:
    control circuitry; and
    at least one adjustable lens that aligns with a respective one of the user's eyes, wherein the at least one adjustable lens comprises:
        first, second, and third liquid crystal layers; and
        first, second, and third arrays of electrodes having different orientations, wherein the control circuitry applies first control signals to the first array of electrodes to adjust a phase profile of the first liquid crystal layer, applies second control signals to the second array of electrodes to adjust a phase profile of the second liquid crystal layer, and applies third control signals to the third array of electrodes to adjust a phase profile of the third liquid crystal layer.

17. The eyeglasses defined in claim 16 further comprising:
- control signal lines that distribute control signals to the first array of electrodes, wherein the first array of electrodes have a first pitch and wherein the control signal lines have a second pitch that is larger than the first pitch; and
- a conductive line coupled between the control signal lines and the first array of electrodes, wherein the conductive line has a distributed resistance that defines a voltage value received by each of the electrodes in the first array of electrodes.

18. The eyeglasses defined in claim 16 wherein the first array of electrodes comprises top electrodes and bottom electrodes, wherein the top electrodes overlap gaps between the bottom electrodes, and wherein the bottom electrodes overlap gaps between the top electrodes.

19. The eyeglasses defined in claim 16 further comprising:
- a sensor system that tracks a location of the user's gaze, wherein the first, second, and third control signals are based on the location of the user's gaze.

20. The eyeglasses defined in claim 19 wherein the control circuitry applies the first control signals to a first subset of the first array of electrodes to adjust the phase profile of only a first portion of the first liquid crystal layer, applies the second control signals to a second subset of the second array of electrodes to adjust the phase profile of only a second portion of the second liquid crystal layer, and applies the third control signals to a third subset of the third array of electrodes to adjust the phase profile of only a third portion of the third liquid crystal layer.

* * * * *